Feb. 2, 1954     H. BREDEMEIER     2,668,068
SEAL FOR ROTARY SHAFTS
Filed Sept. 8, 1949
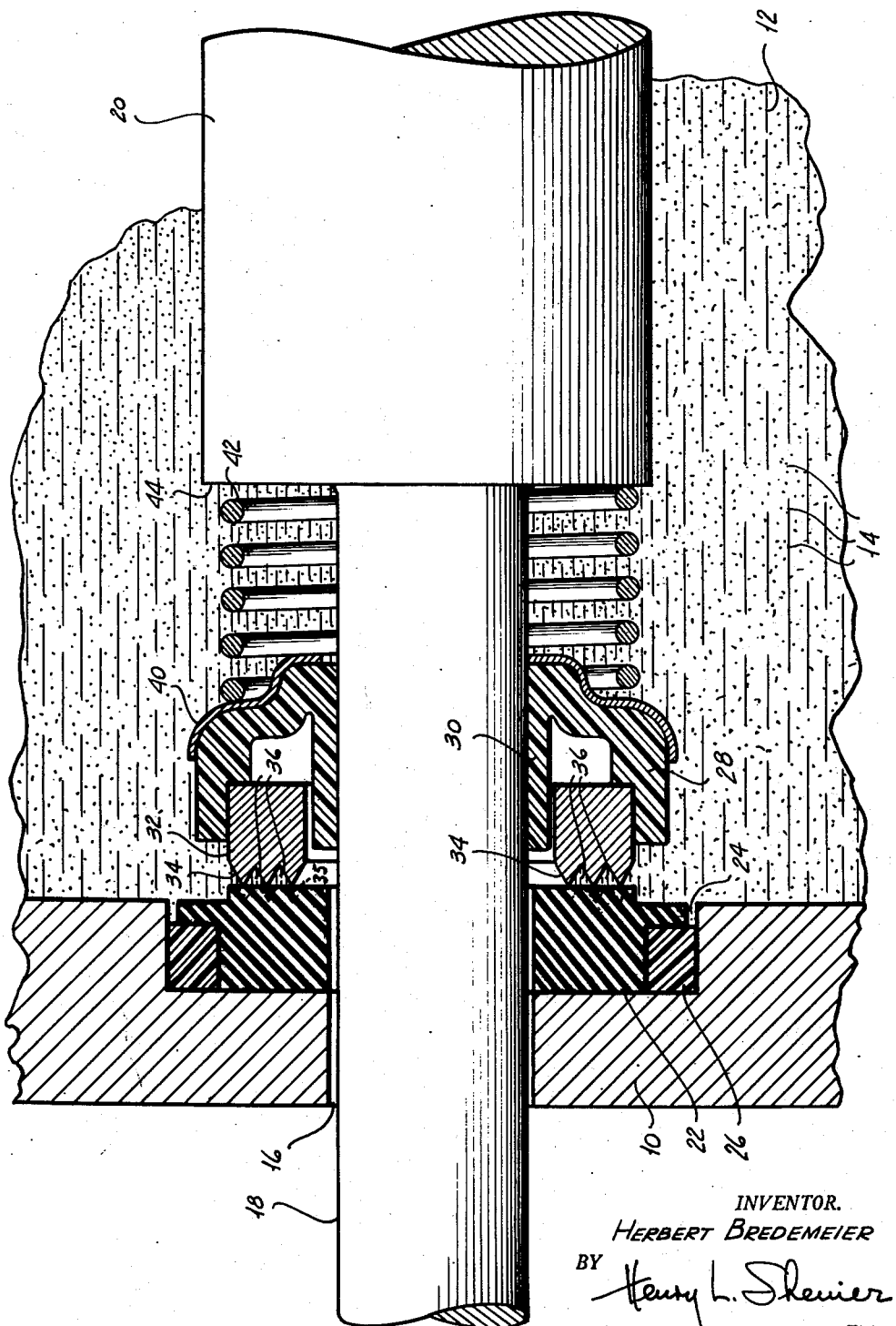
INVENTOR.
HERBERT BREDEMEIER
BY *Henry L. Shevier*
ATTORNEY Patented Feb. 2, 1954

2,668,068

UNITED STATES PATENT OFFICE 2,668,068

SEAL FOR ROTARY SHAFTS

Herbert Bredemeier, Ossining, N. Y., assignor to The Norden Laboratories Corporation, New York, N. Y., a corporation of Connecticut Application September 8, 1949, Serial No. 114,578

8 Claims. (Cl. 286—11)

My invention relates to an improved seal for rotary shafts and more particularly to a seal adapted to be used whenever a rotary shaft passes through a wall one side of which contains a fluid.

It is necessary in many applications to pass a rotary shaft into a chamber containing a fluid as in the case of agitators, mixers and the like in chemical industries. The Bureau of Standards has developed a magnetic fluid clutch in which two disks are positioned adjacent to each other in a fluid in which is suspended colloidal magnetic metal such as iron. The oil is normally fluid and an input shaft merely rotates a plate adjacent an output plate which is also connected to a shaft without transmitting torque between the shafts. When, however, the fluid containing the suspended magnetic metal is subjected to a magnetic field it becomes extremely viscous so that torque is readily transmitted between the plates. One of the difficulties in adapting the magnetic fluid clutch to successful commercial use has been the lack of an adequate rotary shaft seal. The difficulty has been occasioned by the presence of the colloidal particles of iron or other magnetic material which act as a fine abrasive and wear sealing materials to such an extent that they must be replaced at very frequent intervals.

One object of my invention is to provide a rotary shaft seal especially adapted for use with a fluid magnetic clutch which will prevent the fluid from leaking past the seal and which will form its sealing function for extended periods of time.

Another object of my invention is to provide a rotary shaft seal which is simple to manufacture, sturdy in construction and which may be used with abrasive materials over extended periods of time.

In general, my invention comprises the provision of a seal seat formed with nylon coacting with a seal face formed with concentric grooves terminating in sharp edges of a hard metal such as hardened and polished steel. Any hard material adapted to resist abrasion and retain its configuration is suitable. The lasting quality of the seal is determined in part by the hardness of the seal face. The seal face is biased by a spring to seat upon the seal seat.

The accompanying drawing is an elevation with parts in section showing one embodiment of my invention.

More particularly, referring now to the drawing, the wall 10 represents the boundary wall of a container in which is positioned a fluid 12, such as oil, containing carbonyl iron particles 14 disseminated throughout the oil. The wall 10 is formed with an opening 16 through which a shaft 18, which may be an input or output shaft, passes. The magnetic fluid clutch forms no part of the instant invention and is not shown. One of the plates of the clutch is secured to the member 20 adapted to rotate with the shaft 18. The seal seat 22 is formed of a disk of nylon machined to the shape shown. It is positioned in a reentrant portion 24 formed in the wall 10 and is held in a flexible ring of synthetic rubber or the like 26 which seals the seat 22 to the housing at its outer periphery. There is no relative movement between the seat 22 and the housing wall 10. The seat 22 is made of "nylon" which is a synthetic plastic comprising long-chain polymeric amides in which the amide groups form an integral part of the main polymer chain. It is produced by the reaction of adipic acid and hexamethylene diamene. The material has great strength, elasticity and toughness. It has a high softening point of 450° F. I am aware that molded nylon has been used for valve seats in pressure valves, but its application to rotary shaft seals where abrasive materials are present is entirely new, and its resistance to abrasion in connection with a hard metal seal face produces remarkable results which could not be anticipated until tried.

A cup member 28 formed of synthetic rubber adapted to resist the action of oil is formed with a cylindrical sleeve 30 adapted to be placed around the shaft 18 with sufficient extension to form a good seal between the shaft and the sleeve 30. The periphery of the cup holds a ring 32 which is formed of hard material and is keyed to the cup in any appropriate manner to insure that there will be no relative motion between the cup member and the seal face 32. A hard material is required to resist abrasion. In a seal which I tested the ring was made of hardened and polished steel having a hardness of about 500 Brinell. Ordinary steels are also adequate but will not retain the configuration shown in which the steel ring 32 is provided with a plurality of wedge-shaped ridges 34. The grooves 36 between the ridges 34 are filled with a heavy lubricant on assembly. This lubricant assists in preventing leakage by presenting a dense obstructing medium to any substance attempting to leak past the ridges. The heavy lubricant which may be a grease is gradually extruded as the nylon seat gradually wears. Furthermore, the lubricant helps lower the friction between the sealing surfaces. The sharp ridges produce a series of high pressure barriers past which fluid passes with difficulty. The ridges 34 are concentric so that there is no eccentric wiping action which might induce pumping or aid leaking. As the seal is in use the seal seat 22 would gradually wear, producing matching grooves 35 shown in dotted lines in the drawing. The number of grooves and ridges used is a matter of design and represents a compromise. The use of a greater number of grooves and ridges increases the effectiveness of the seal. On the other hand, friction is increased due to the presentation of a wider friction area. However, the pressure with which the seal face seats against the seal seat is spread over a wider area so that friction is somewhat reduced per unit of area. Eventually the heavy lubricant 36 is completely extruded from the seal and the pressure barriers are resolved into an uniformly distributed area and the sealing surfaces which remain have a labyrinth structure providing an effective seal.

A metal cup 40 having a shape of the synthetic rubber element 28 faces the back of the element 28 and acts as a bearing member for a spring 42 positioned between it and the surface 44 on the enlarged portion 20 of the shaft 18. The spring 42 urges the rubber cup 28 to the left as viewed in the drawing and carries the seal face 32 to the left against the nylon seal seat 22.

I have found that the nylon yields just enough to facilitate the initial mating of the seal surfaces and that a good seal is formed even without the use of a heavy lubricant or grease 36 in the grooves between the ridges 34. In testing my seal, using a magnetic clutch fluid containing carbonyl iron and machine oil, I rotated the shaft at a speed of 720° per second. The seal face in this first test was made of ordinary stainless steel not hardened. The speed of test rotation gave an average relative motion at the sealing surface for the size of the parts of about 3.5 inches per second. The test was run for 1400 hours continuously and the direction of rotation was reversed periodically every two seconds. After 200 hours of continuous test there was no leakage of any kind and no appreciable wear at the sealing elements. After 500 hours of continuous testing there was a slight wear of the steel and there was no leakage of any kind. The nylon showed substantially no wear. After 1400 hours of continuous testing with the exception of the brief intervals for inspection the nylon still showed surprisingly little wear, but the stainless steel which had a hardness of about 200 Brinell showed appreciable wear, but the seal did not leak.

Another test was conducted using the hardened and polished vanadium steel for a face and nylon for the seal seat. After 800 hours of testing at a higher speed to give a relative motion at the sealing surface of about 7 inches per second there was substantially no wear either on the nylon or on the seal face, and it appears that I have solved the problem of providing a rotary shaft seal for use with abrasive materials such as fluid for a magnetic fluid clutch. The construction is such that vibration of the shaft is not transmitted to the seal. There is sufficient clearance between the shaft and the opening 16 through which the shaft projects into the fluid chamber. The synthetic rubber cup 28 will absorb any slight vibrations which might be present and not transmit them to the sealing ring 32. The mating of the sealing surfaces resists displacement radially and the seal will run for long periods of time without leakage and without replacement of parts. When a hardened steel seal face is used the little wear which does take place occurs partially in the nylon seat and to a lesser extent in the hardened steel face so that ridges on the seal face will move to the dotted line position indicated by the reference numeral 35 in the drawing.

I have tried other plastics and other materials for the seal face but have found none of them suitable. Carbon compositions all wear quickly under the abrasive action of the iron carbonyl particles.

It will be seen that I have accomplished the objects of my invention. I have provided a rotary shaft seal especially adapted for use with fluid magnetic clutches using abrasive fluids which will prevent the fluid from leaking past the seal for extensive periods of time. I have provided a rotary shaft seal which is simple to manufacture, sturdy in construction and which requires little attention or replacement of parts over comparatively long periods.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A rotary shaft seal including in combination a removable annular nylon seat, means for mounting said seat on the wall of the housing containing fluid to be sealed, a hard steel annular ring having a hardness of at least 200 Brinell formed with a portion of reduced cross-sectional area to provide substantially line contact with the nylon seat and surrounding the shaft to be sealed, means for mounting said ring on the shaft for rotation therewith and means for sealing the area between the inner periphery of the ring and the shaft.

2. A rotary shaft seal including in combination a removable annular nylon seat, flexible means for mounting said seat on the wall of a housing containing fluid to be sealed, a hardened steel annular ring having a hardness of at least 200 Brinell formed with a portion of reduced cross-sectional area to provide substantially line contact with the nylon seat and surrounding the shaft to be sealed, flexible means for mounting said ring on the shaft for rotation therewith and means for sealing the area between the inner periphery of the ring and the shaft.

3. A rotary shaft seal as in claim 2 in which said flexible mounting means for the seat comprises a rubber ring adapted to form a seal between the outer periphery of the seat and the wall of the housing containing the fluid to be sealed.

4. A rotary shaft seal including in combination a removable annular nylon seat, means for mounting said seat on the wall of the housing containing fluid to be sealed, a hardened steel annular ring having a hardness of at least 200 Brinell formed with a portion of reduced cross-sectional area to provide substantially line contact with the nylon seat and surrounding the shaft to be sealed, means for mounting said ring on the shaft for rotation therewith, means for sealing the area between the inner periphery of the ring and the shaft and means biasing said ring to seat upon said nylon seat.

5. A rotary shaft seal as in claim 4 in which said portion of reduced cross-sectional area comprises a plurality of ridges with intermediate grooves.

6. A rotary shaft seal as in claim 4 in which said portion of reduced cross-sectional area comprises a plurality of ridges with intermediate grooves and a viscous lubricant positioned in said grooves.

7. A rotary shaft seal for use with abrasive fluids including in combination a housing adapted to contain an abrasive fluid having a wall formed with an opening for the passage of a rotary shaft, a removable seal seat formed of nylon, means for mounting the seal seat to said wall surrounding said opening, a ring formed of steel hardened to at least 200 Brinell surrounding said shaft and positioned within said housing, said ring constituting the seal face and formed with a portion of reduced cross-sectional area to provide substantially line contact with the nylon seat, means for mounting said ring for rotation with said shaft adjacent the seal seat and means for sealing the area between the inner periphery of said ring and said shaft.

8. A rotary shaft seal as in claim 7 in which said wall is formed with a reentrant portion and said mounting means for the seal seat comprises a rubber sealing ring sealing the area between the outer periphery of said seal seat and the inner periphery of the reentrant wall portion.

HERBERT BREDEMEIER.

References Cited in the file of this patent

UNITED STATES PATENTS

| Number | Name | Date |
|---|---|---|
| 883,155 | Westinghouse | Mar. 24, 1908 |
| 2,149,524 | Huhn | Mar. 7, 1939 |
| 2,252,554 | Carothers | Aug. 12, 1941 |
| 2,362,436 | Stratford | Nov. 7, 1944 |
| 2,373,463 | Curtis | Apr. 10, 1945 |
| 2,467,543 | Voytech | Apr. 19, 1949 |

FOREIGN PATENTS

| Number | Country | Date |
|---|---|---|
| 483,280 | Great Britain | Apr. 12, 1938 |
| 588,766 | Germany | Nov. 27, 1933 |

OTHER REFERENCES

Du Pont Plastics Catalog (pages 5 and 6). (Copy in 288–SR, Div. 52, Pat. Off.)

Product Engineering, December 1946, pages 103–107. (Copy in Class 288–SR, Div. 52, Pat. Off.)